United States Patent [19]

Retz

[11] 4,365,929

[45] Dec. 28, 1982

[54] VERTICAL WIND TURBINE POWER GENERATING TOWER

[76] Inventor: Philip Retz, 1783 Lanier Pl., NW., Washington, D.C. 20009

[21] Appl. No.: 225,781

[22] Filed: Jan. 16, 1981

[51] Int. Cl.³ ............................................. F03D 3/04
[52] U.S. Cl. ................................ 415/2 R; 416/197 A
[58] Field of Search ..................... 415/2 R, 3 R, 4 R; 416/197 A

[56] References Cited

U.S. PATENT DOCUMENTS

| | | | |
|---|---|---|---|
| 259,569 | 6/1882 | McLachlan | 415/3 |
| 465,439 | 12/1891 | Vinal | 416/197 A |
| 611,406 | 9/1898 | De Remer | 416/197 R |
| 979,098 | 12/1910 | Scheubeck | 415/2 R |
| 1,126,069 | 1/1915 | Palmer | 416/119 |
| 1,234,405 | 7/1917 | Solomon | 415/3 |
| 1,441,774 | 1/1923 | Adams | 415/4 R X |
| 1,503,061 | 7/1924 | Pendergast | 415/2 R |
| 1,523,295 | 1/1925 | Ryan | 415/2 R |
| 1,595,578 | 8/1926 | Sovereign | 415/2 R X |
| 1,708,374 | 4/1929 | Adams | 415/52 |
| 1,764,052 | 6/1930 | Pfeifer | 415/3 R X |
| 2,812,823 | 11/1957 | De Oviedo | 415/129 |
| 2,968,436 | 1/1961 | Coester | 415/54 |
| 3,793,503 | 2/1974 | Carter | 219/106 |
| 3,930,750 | 1/1976 | Schultz | 416/197 A |
| 3,938,907 | 2/1976 | Magoveny et al. | 415/4 R X |
| 3,986,785 | 10/1976 | Ferencz | 415/3 R X |
| 4,017,205 | 4/1977 | Bolie | 415/2 R |
| 4,059,969 | 11/1977 | Awalt | 415/3 R X |
| 4,086,498 | 4/1978 | Szoeke | 290/55 |
| 4,134,707 | 1/1979 | Ewers | 415/4 |
| 4,236,866 | 12/1980 | Martinez | 415/2 R |
| 4,269,563 | 5/1981 | Sharak et al. | 415/2 R |

FOREIGN PATENT DOCUMENTS

| | | | |
|---|---|---|---|
| 867380 | 2/1953 | Fed. Rep. of Germany | 415/2 R |
| 365643 | 3/1907 | France | 416/197 A |
| 515331 | 3/1921 | France | 415/2 R |
| 1055052 | 2/1954 | France | 415/2 R |
| 59016 | 4/1954 | France | 415/2 R |
| 2418996 | 2/1979 | France | 416/197 A |
| 2448049 | 10/1980 | France | 416/197 A |
| 406661 | 12/1943 | Italy | 415/2 R |
| 55-142978 | 7/1980 | Japan | 415/2 R |
| 188653 | 3/1923 | United Kingdom | 415/2 R |
| 364876 | 1/1932 | United Kingdom | 416/197 A |
| 667587 | 3/1952 | United Kingdom | 415/2 R |
| 542016 | 3/1977 | U.S.S.R. | |

*Primary Examiner*—Everette A. Powell, Jr.
*Attorney, Agent, or Firm*—Saidman, Sterne & Kessler

[57] ABSTRACT

The tower comprises a base supported on a framework which mounts a wind powered turbine having a vertical axis of rotation. Air is channeled to the turbine rotor to cause counterclockwise rotation thereof by upper and lower wind deflectors. The wind deflectors include channels which cause the oncoming air to swirl in a counterclockwise motion into the rotor transmitting energy thereto. The vertical struts of the framework are also configured so as to deflect the oncoming air into the rotor in a counterclockwise direction. The rotor itself comprises columns of vertically spaced, radially extending scoops and radially extending curved blades to ensure highly efficient energy conversion. The rotor is formed with no center shaft to allow free flow of air therethrough.

37 Claims, 16 Drawing Figures

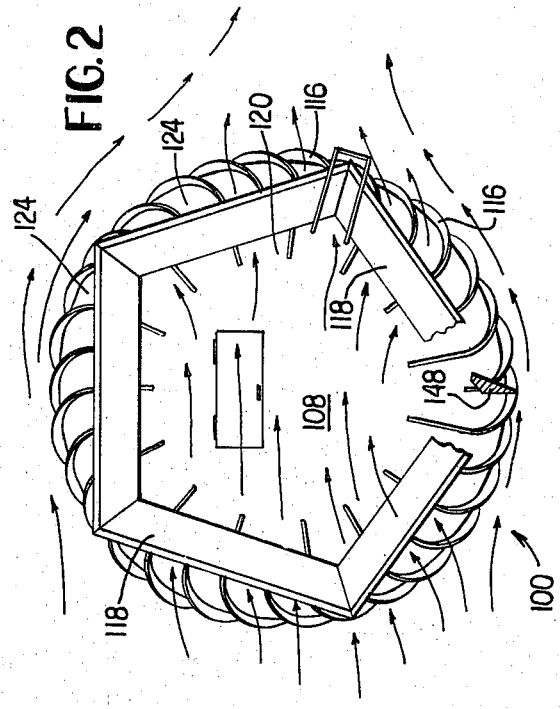
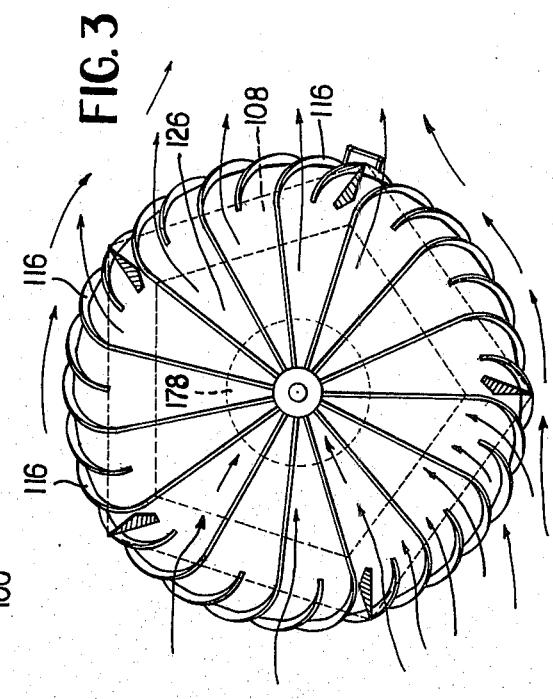
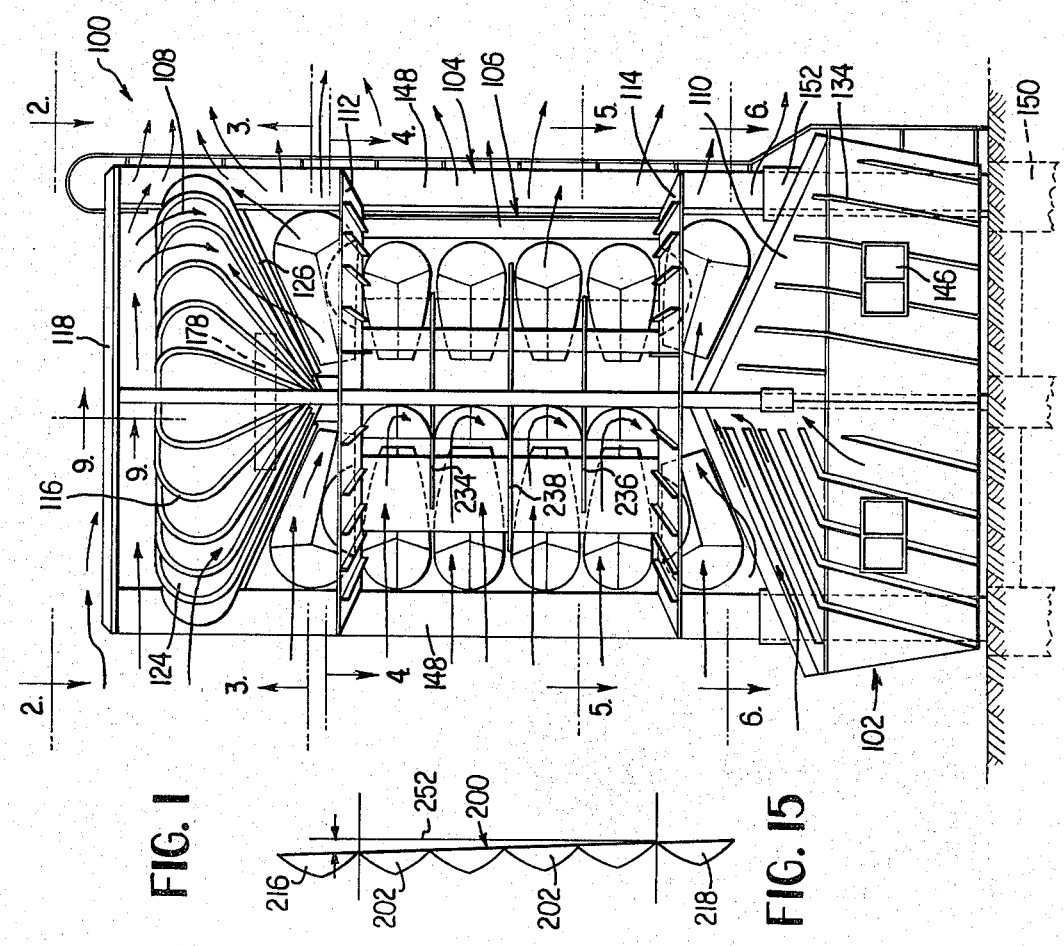

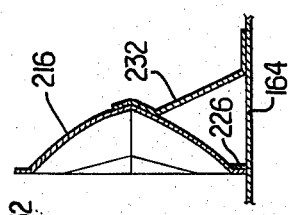
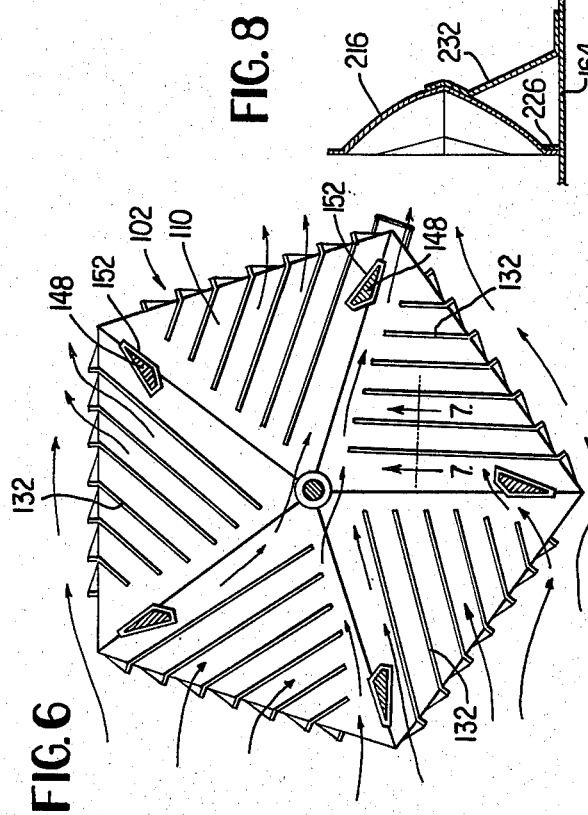
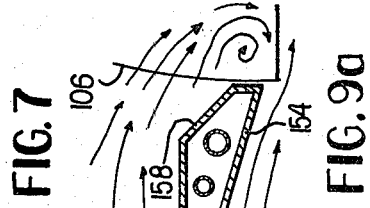
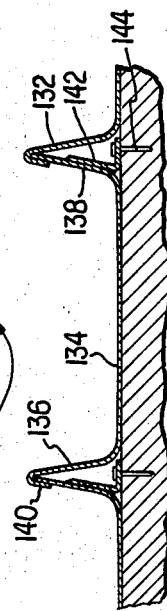
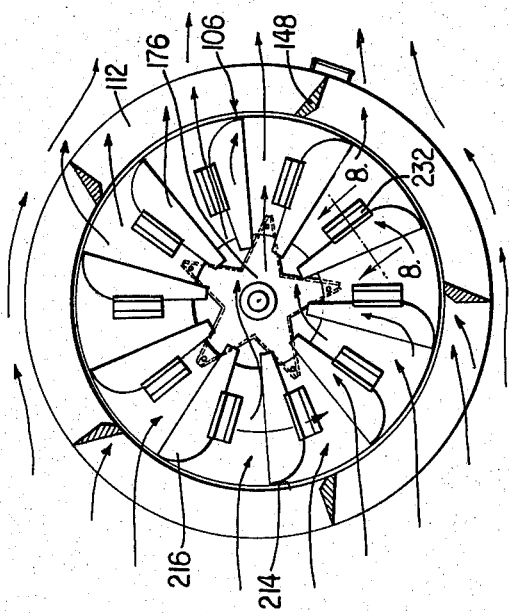
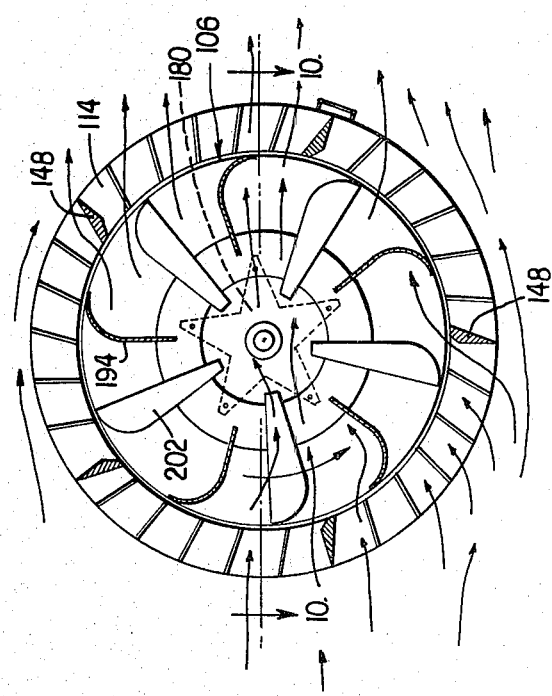

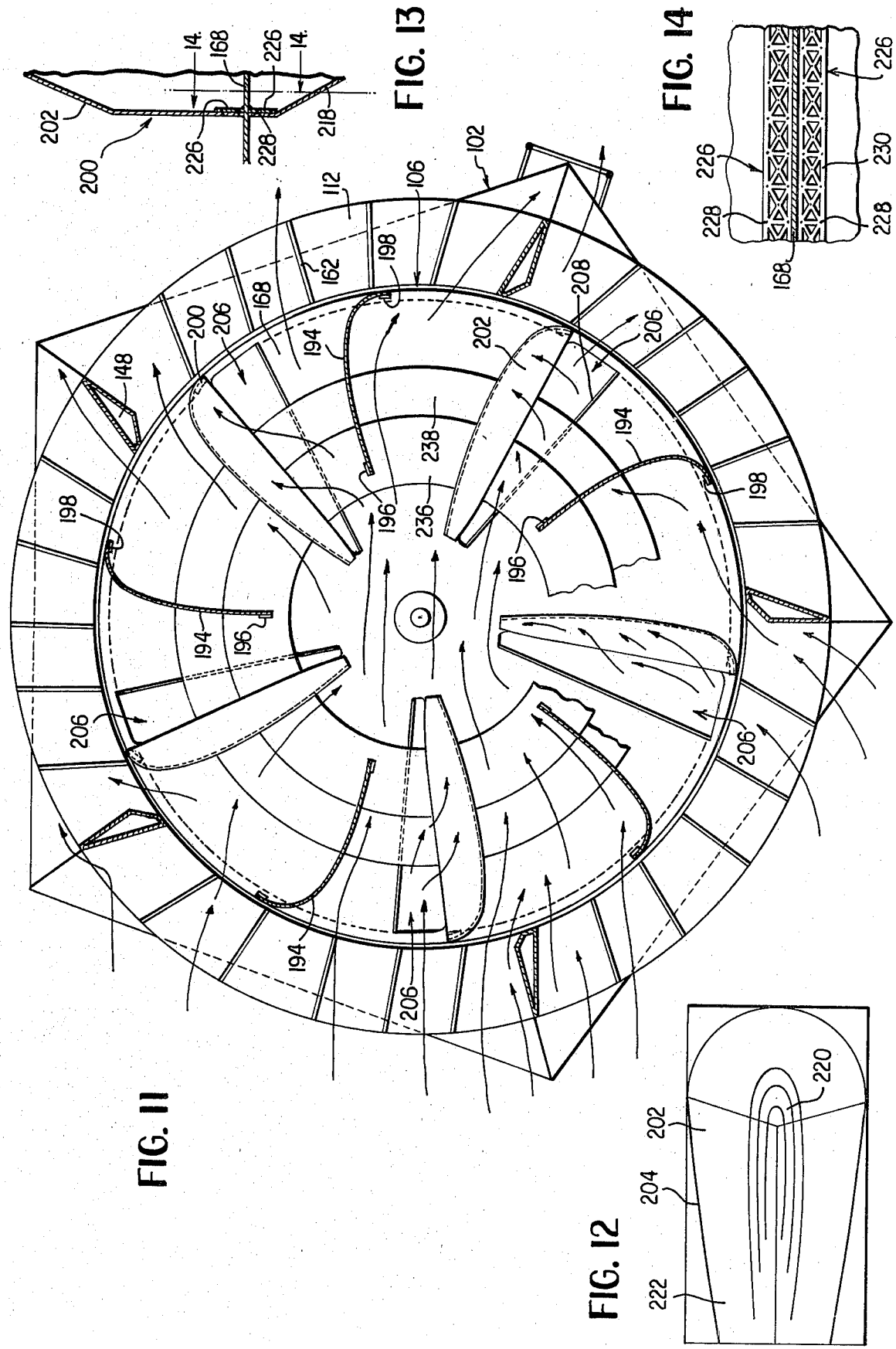

VERTICAL WIND TURBINE POWER GENERATING TOWER

BACKGROUND OF THE INVENTION

1. Field of the Invention

This invention relates to wind powered energy conversion systems and especially to wind turbins, which is defined herein as being a turbine having vertical axis and rotation.

2. Description of the Related Art

With the constantly increasing costs of energy, a clear need for the development of alternative sources of energy has become apparent. One such alternative source of energy is wind power. However, in spite of the fact that the use of wind energy is often discussed, very little progress has actually been made toward this end.

Modern windmill development has centered around large bladed windmills with blades in the range of 75-100 feet in length. The blades spin about a horizontal axis and are positioned 100 feet or more in the air. These windmills have a number of drawbacks. First, they are prohibitively expensive to construct. Also, they are usually located in windy, barren areas requiring the use of heavy lines or cables for power transmission to factories, homes or a central power grid. These windmills can also be dangerous. For instance, a blade can be thrown several hundred feet when it becomes crystallized. Furthermore, the rotating structure of this type of windmill is required to revolve or yaw upon a vertical axis in order to insure that the propeller blades are properly aimed into the oncoming wind. While the wind direction may change rapidly, the yaw of the rotating structure can take substantial time. This results in a large decrease in rotor revolutions per minute with an attendant decrease in power output, thereby significantly reducing efficiency. Also, the movement can be excessively noisy and requires additional complexity in that structure must be provided to ensure that electrical energy is passed to current carrying cable during the time in which the structure revolves.

Wind energy conversion systems having a vertical axis of rotation have also been suggested. These systems have the inherent advantage of being capable of accepting wind energy from any direction without the necessity of movement of the system supporting structure. However, presently designed systems of this nature have not proven to be sufficiently efficient to justify their construction.

I am aware of the following United States Patents which may be related to this general area: Nos. 259,569; 611,406; 1,234,405, 1,523,295; 1,708,374; 2,968,436; 3,793,530; 4,017,205; 4,086,498; and 4,134,707. Russian Pat. No. 542,016 may also be of interest.

SUMMARY OF THE INVENTION

A primary object of the present invention is to provide a wind turbin power generator which is highly efficient in converting wind power to mechanical energy.

A further object of the present invention is to provide a wind turbin generator which is sufficiently safe, strong and durable in operation as well as efficient to enable its use in urban areas, for example, on the roofs of buildings for providing some or all of the energy needs of the building.

A further object of the present invention is to provide a wind turbin power generator which is quiet as well as efficient in use so as not to add to the already high level of noise pollution existing in most urban areas.

Another object of the present invention is to provide a wind turbin generator which can be built without the use of guy wires thereby eliminating problems, such as slackening and tensioning of the wires during hot and cold weather, and potential sabotage, which are inherent in guy wire use.

A still further object of the present invention is to provide a wind turbin power generator which can incorporate an end use function such as a water storage system or compressed air storage system in the basic design so as to economize on the cost of construction.

In accordance with the above objects, the wind turbin power generating tower of the present invention comprises a tower structure including a base in the form of a building housing the control room for the invention and a framework comprising a plurality of vertical struts connected at their upper ends by a plurality of horizontal struts disposed in a pentagonal configuration. The rotor of the turbine is mounted within the framework and adapted to rotate in a counterclockwise direction. An upper air deflector is contained within the framework above the rotor and oncoming air is forced downwardly to the rotor by use of channels disposed in downwardly converging spirals on the deflector surface. The upper air deflector can be in the form of a water tank or compressed air tank having a conical bottom surface upon which the channels are formed. The tank can be used to enclose upper bearings for mounting the rotor as well as an upper flywheel and brake assembly for rotor control. A lower air deflector is formed by the roof of the control room. Channels are contained on the roof also for forcing oncoming air into the rotor in an appropriate direction to cause counterclockwise rotation thereof at all times. The vertical and horizontal structural members of the framework also have specially designed surfaces which impart directional control of the oncoming air streams to improve efficiency of the device. Furthermore, specifically designed deflector rings are attached to the vertical structural deflector members for rigidity and encircle the rotor to further control air stream direction as well as increase compaction of the air to improve efficiency. The air compaction can be helpful in several ways. It increases power density of the airstream and reduces time dependent variations thereof. Also, when the compacted air exits, it expands thus imparting energy to the blades on the leeward side of the rotor.

The rotor itself is specifically designed to fully utilize the air circulation patterns generated by the various deflector elements as well as to operate quietly. The rotor is formed without use of a center shaft in order to allow full free flow of air through the rotor thus reducing turbulence and resistance. The rotor is mounted via upper and lower disks which are interconnected by a plurality of curved blades. The disks are mounted by upper and lower shafts respectively to the upper air deflector and the base. The blades extend entirely between the upper and lower disks and are also interconnected by a pair of bracing rings and a center disk in order to provide sufficient structural torque rigidity to the rotor. Between alternate blades are columns of radially extending scoops. Each column of scoops is formed in a continuous panel, which panel is mounted to the rotor disks and bracing rings. The blades and vertically adjacent scoops can be offset slightly top to bottom in order to allow the rotor to slice through the air rather than chop at the air thereby significantly reducing the noise level generated by operation of the invention. Additional scoop arrays are mounted on top of the upper mounting disk and on the bottom of the lower mounting disk in order to fill the gap between the mounting disks and the upper and lower air deflectors. Slots are formed in the upper and lower mounting disks in order to allow air stream communication between various rotor elements. Reinforcing rings are mounted to the upper side of the upper disk and to the lower side of the lower disk to reinforce the areas where the slots are opened. Also, it is necessary that a "wind rose" be used to orient the machine for full use of the prevailing winds.

BRIEF DESCRIPTION OF THE DRAWINGS

Additional objects, features and advantages of the present invention will become more readily apparent as the invention becomes more fully understood from the following detailed description of the invention considered in connection with the accompanying drawings in which like reference numerals represent identical or corresponding parts throughout the several views, wherein:

FIG. 1 is an elevational view of a wind turbine power generator tower built in accordance with the present invention;

FIG. 2 is a top plan view of the tower of FIG. 1 with a portion broken away to show one vertical structural deflector cross-section, the ladder and the trap door for inspection and servicing;

FIG. 3 is a bottom plan sectional view of the tower of FIG. 1 taken substantially along a plane passing through section line 3—3 of FIG. 1 with the upper scoop array removed;

FIG. 4 is a top plan sectional view of the tower taken substantially along a plane passing through section line 4—4 of FIG. 1;

FIG. 5 is a top plan sectional view of the tower taken substantially along a plane passing through section line 5—5 of FIG. 1;

FIG. 6 is a top roof plan sectional view of the tower taken substantially along a plane passing through section line 6—6 of FIG. 1 with the lower scoop array removed;

FIG. 7 is a sectional view taken substantially along a plane passing through section line 7—7 of FIG. 6 showing details of the wind channel construction;

FIG. 8 is a sectional view taken substantially along a plane passing through section line 8—8 of FIG. 4 showing the support structure for the upper scoop array;

FIG. 9 is a sectional view taken substantially along a plane passing through section 9—9 of FIG. 1 and showing the air flow pattern about one horizontal structural deflector as well as the pipes, conduit and hot air channel passing therethrough;

FIG. 9A is an enlarged view of one vertical structural deflector of FIG. 11 showing the air flow pattern in detail as well as the pipes, conduit and hot air channel passing therethrough;

FIG. 11 is a top plan sectional view similar to FIG. 5 but showing additional details of the invention;

FIG. 12 is an enlarged view of one scoop showing the internal ridges formed thereon;

FIG. 13 is an enlarged sectional view taken substantially along a plane passing through section line 13—13 of FIG. 10 showing the connection of the scoops to a disk; and FIG. 14 is an enlarged sectional view taken substantially along a plane passing through section line 14—14 of FIG. 13 showing the scoop and disk stiffeners.

FIG. 15 is a sectional view of one column of scoops showing how vertically adjacent scoops are slightly offset with respect to each other.

DETAILED DESCRIPTION OF THE PREFERRED EMBODIMENT

Figure 10:
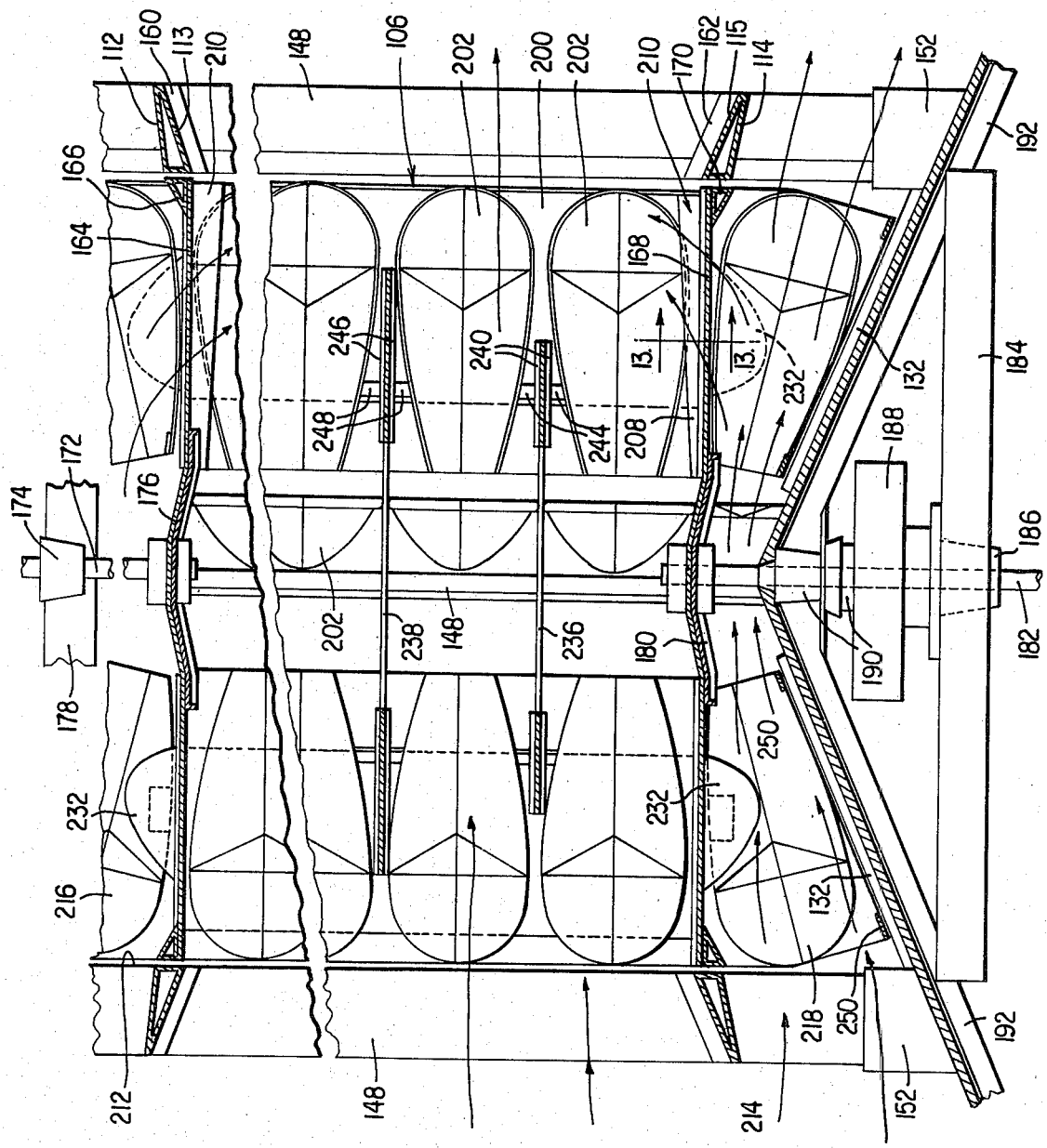
FIG. 10 is an elevational sectional view taken substantially along a plane passing through section line 10—10 of FIG. 5.

Now with reference to the drawings and with particular reference to FIG. 1, a wind turbine power generating tower incorporating the principles and concepts of the present invention and generally referred to by the reference numeral 100 will be described in detail. It can be seen that the tower 100 includes a base and control room 102 which is mounted to framework 104 and supports the lower portion of turbin rotor 106. The base 105 and control room 102 can house any utilization devices such as generators, air compressors, water pumps or other devices run directly from the power shaft. There also would normally be an automatic transmission for power control and a meter to a utility line. Supported on the top of framework 104 is an upper air deflector 108 which forces air downwardly in a counterclockwise spiral pattern onto the rotor 106 in the leeward partial vacuum side. Thus, the wind forced on rotor 106 is not only compacted by use of deflector 108 but is also channeled in the proper direction to most efficiently utilize it. In like manner, a lower air deflector 110, which comprises essentially the outer surface of base and control room 102, forces air upwardly in a semi-spiralled pattern into the rotor 106 to further enhance the efficiency of the invention. Upper and lower deflecting rings 112 and 114 are also connected to the framework 104 to add a further compaction to the air channeled to the rotor and also to control the direction of impinging air streams.

With respect to FIGS. 1, 2 and 3, it can be seen that the upper air deflector 108 comprises a volumetric element having a flat upper surface 120 with a conical lower surface 126 with the transition therebetween comprising a curved perimeter portion 124. Disposed on the surfaces are a plurality of wind channels 116 which extend from the flat surface 120 to the conical surface 126 in a spiral manner thus imparting a swirling motion directing any air streams contacting them towards the rotor 106. Also, it can be seen with reference to the wind direction arrows shown in FIGS. 1, 2 and 3 that the shape of the air deflector itself serves to create a low pressure area on the leeward side of the tower to draw expended air from the rotor 106. As seen in FIGS. 2 and 3, this action is partially created by the circular design of the air deflector as viewed in plan. Also, as seen in FIG. 1, the curved peripheral edge 124 aids this function. In addition, the horizontal structural deflectors 118 enhance this effect. Deflectors 118 comprise the upper portion of framework 104 and are connected to form a pentagonal structure as seen in FIG. 2. This configuration serves to enhance the rigidity of the framework. The cross-section of one structural deflector 118 is shown clearly in FIG. 9 wherein it will be seen that the upper wall 128 is flat and disposed horizontally. A lower wall 122 is sloped downwardly and meets the wall 128 to form a knife edge. Air currents impinging on wall 122 are forced downwardly over the curved perimeter 124 to enhance the formation of a lower pressure area. Further, a slanted outer edge 130 serves to create an additional low pressure area drawing air currents passing over wall 128 downwardly to join the currents forced downwardly by wall 122. Also, it has been observed that a pentagonal shape fits the prevailing wind flow or wind rose patterns present in major areas of the U.S. Thus, this pattern for the frame allows greater air flow through the tower with less resistance.

The lower air deflector covering control room 102 also contains wind channels shown at 132 in FIGS. 1 and 6. The base is formed in a pentagonal shape with a plurality of triangular roof panels. The wind channels 132 extend up the sides of the control room and are slanted to direct the wind toward the rotor in a clockwise direction as is evident from FIG. 1. The channels 132 extend along the associated roof sections in a direction parallel to one side of the roof section on which they are mounted and terminate a short distance from the beginning of the next adjacent roof section. Accordingly, air currents impinging on any particular portion of the base will be channeled up the sides and across the roof in a manner to impart counterclockwise motion to the rotor. The construction of a wind channel 132 is shown in detail in FIG. 7 wherein it can be seen that the channel can be formed in panels 134 having forward and rearward raised edges 136 and 138, respectively. The forward raised edge 136 has an overlapping edge 140 which engages the next adjacent rear raised edge to form a channel. Each panel includes a nailing strip 142 affixed to the rear raised edge. Accordingly, with one panel nailed down, the next adjacent panel can be positioned to cover the nail 144 and associated nailing strip 142. Alternatively, the panels could be glued to the underlying surface. The panels can be formed of plastic, Kevlar ® or other durable material.

Referring again to FIG. 1, it can be seen that the entire tower 100 is supported by the five vertical structural deflectors 148 which are connected to pilings 150 in the ground. Thus structural deflectors 148 extend entirely through the base which is supported thereby. Clearly, details of construction would include the use of flashing 152 to prevent leaks in the roof of the base and windows shown at 146. Also, the structural deflectors 148 can be hollow as depicted in FIG. 9a to carry conduit to the roof to provide electrical and mechanical connections for items such as red warning lights, weather vanes, windspeed indicators, and heater cables for keeping the struts free of ice and snow during inclement weather. Further, a ladder 147 is mounted to the exterior of frame 104 to permit access to the top of the tower containing upper air deflector 108. A door 149 is contained in surface 120 to permit entry into the structure forming the air deflector 108.

The structural deflectors 148 themselves are designed to enhance directional control of oncoming air streams as is evident with respect to FIGS. 9A and 11. In FIG. 9A, it is clear that in its optimum orientation with respect to the oncoming air stream, deflector edge 154 diverts the air slightly to produce counterclockwise rotor rotation. Side 156 of the deflector 148 is oriented radially with respect to the rotor and allows the air to pass directly over it. Edge 158 causes a reduced air pressure area drawing the oncoming air laterally into the rotor 106, also causing counterclockwise rotation.

In FIGS. 4, 5, 10 and 11, it can be seen that the upper and lower deflecting rings 112 and 114 are designed with radially outwardly pointing knife edges to cut through oncoming air streams thus reducing resistance to air flow. The width of each ring increases inwardly with the lower wall 113 of the upper ring 112 sloping downward and the upper wall 115 of lower ring 114 slanting upwardly. Walls 113 and 115 cause air diversion toward the center of the rotor 106 and also provide for compaction of the air to increase the transmitted air force. Each deflector ring also has a series of channels located thereon. Channels 160 depend from slanted wall 113 of deflector ring 112 while channels 162 extend up from the wall 115 of deflector ring 114. The channels 160 and 162 are skewed slightly with respect to a rotor radius to force the oncoming air currents into the rotor in a counterclockwise direction. The deflecting rings 112 and 114 also improve the structural rigidity of the tower by tying the struts 148 together. The deflecting rings can further reduce any vibrations set up by the wind that would occur in a column so slender.

Now with reference to FIGS. 1, 4, 5, 10 and 11, the details of the rotor 106 will be set forth. The rotor is spaced not more than one-half inch from the supporting structure and includes an upper mounting disk 164 having a reinforced peripheral edge shown at 166. The upper disk is rotated with the shaft 172. Shaft 172 is journalled in bearing 174 and tapered bearing 175 which in turn are mounted to brace 178 contained within the upper air deflector structure 108. Similarly, a lower mounting disk 168 is connected to a lower mounting shaft 182. Disk 168 also contains a reinforced peripheral edge 170. The upper and lower disks are further reinforced by the use of star shaped reinforcing elements 176 and 180 which are attached directly below disks 164 and 168 respectively. Each reinforcing star contains downturned reinforced edges to further enhance its rigidity. The reinforcing stars are necessary to rigidify the disks since the rotor is built without use of a center shaft to allow the free flow of air currents through the center of the rotor. The lower mounting shaft 182 is journalled by tapered roller bearing 186 together with bearing set 190. Mechanically, the rotor is hung from the top by bearings 174 and 175 which are also tapered roller bearings. There will also be side pressure at the bottom which is controlled by bearing 186 and the bearing set 190. Bearing 186 is mounted in a structural member 184 of the base 102 while bearing set 190 is mounted to the roof rafters of the base 102. Flywheels 188 and 189 are mounted on shafts 182 and 172, respectively, to maintain inertia and insure smooth operation of the rotor. Also, possibly, within each flywheel there could be contained a governor and automatic braking. Attached to the lower end of shaft 182 within the control room there will be a clutch, transmission, generator or other gearing arrangement to provide output power in the desired form. All fastenings to the drive shaft should include Woodruff keys and at least two large Allen head set screws.

Attached between the disks 164 and 168 are a plurality of blades 194. These blades are radially curved to provide greater air resistance in the direction of counterclockwise rotation. Reinforcing strips 196 and 198 are welded to the opposite ends of each blade and extend entirely between the upper and lower disks. Also attached between the upper and lower mounting disks 164, 168 are scoop panels 200. Scoop panels 200 alternate with the blades 194 to form a plurality of circumferentially spaced and radially extending wind-gathering elements which comprise the main part of the rotor. Each scoop panel contains a plurality of scoops 202 which are formed in a manner to be discussed hereinafter. As shown in FIG. 12, the inner surface of each scoop is designed to catch an impinging air stream and prolong the time of contact with the scoop. The scoop outline is defined by perimeter line 204 with a smooth area of the scoop being shown at 222. The innermost area of the scoop contains a plurality of ripples or ridges 220 which perform the function of delaying the exit of an impinging air stream from the scoop.

An all scoop array made of metal and shown at 212 is also mounted above the upper mounting disk 164 to fill the gap between the main rotor section and the upper air deflector 108. This array can be seen most clearly in FIG. 4. Also, a lower scoop array 214, which is made of metal, is mounted below the lower mounting disk 168 to fill the gap between that disk and the lower air deflector 110. No blades are included in the upper and lower arrays since the major purpose of the blades is to provide structural rigidity to the main turbin rotor between the mounting disks. Communication between the arrays and the main turbin rotor is afforded by the formation of a plurality of open slots such as slots 206 shown formed in the lower disk 168 in FIGS. 10 and 11. This allows onrushing air to fill the scoops of the lower scoop array and to spill over through the slots into the scoops positioned thereabove. When open slots are formed in the disks, it will be necessary to reinforce the disks about the periphery of each slot. During formation, the metal of the disk is cut on three sides along the edge of an adjacent scoop. This metal is then bent down on the upper disk 164 as shown at 210, and bent up on the lower disk 168 as shown at 208. The bent portions extend at an angle of approximately 30° from the associated disk. One reinforcement comprises the use of these bent edges.

Each scoop panel 200 and each of the individual upper scoops 216 and the lower scoops 218 is constructed to be extremely durable but light in weight. They can be formed from aluminum, but the preferred construction is from synthetic material such as Kevlar ®. The material would be placed over a form and given one coat of high gloss paint. Also, the scoops will be stretched on reinforcing rails or stiffeners 226 as shown in FIG. 13. The stiffeners 226 are welded to the disks such as disk 168 shown. The synthetic material is attached to the disks by the use of pins 228 which extend therefrom. The pins extend down at an angle of 10° at the upper side of the associated disk and up at an angle of 10° on the lower side of the associated disk. The stiffeners are shown in more detail in FIG. 14 wherein it can be seen that each stiffener comprises a metal strip having a plurality of punched holes 230. The holes are punched so as to leave no sharp corners on the strips. In addition to use of pins 228, the material can be sown to the reinforcing strips to provide additional security. The blades 194 however can be formed as shown but of metal. The scoop is placed on the wind pressure side.

The upper and lower scoop arrays of metal require additional support. This support is provided by the use of metal rings 250 and braces 232 which are shown in FIG. 10 and shown in additional detail in FIG. 8. Each brace 232 is attached to the associated disk as for example disk 164 in FIG. 8. The brace extends to the centerline of the scoop where it is attached thereto. Naturally, the braces 232 of the upper scoop array extend upwardly from the disk 164 while braces for the lower scoop array extend downwardly from the lower disk 168.

Further structural rigidity is afforded the rotor by the use of upper and lower bracing rings 234 and 236 together with large center disk element 238. Rings 234, 236 and disk 238 are shown in FIG. 1 with the disk and the lower ring 236 being shown in more detail in FIG. 10. Clearly, narrow slots must be formed in the scoop panels and blades to accept the rings and disk. Adjacent these slots, reinforcing material is included on the back side as shown in FIG. 10. Also, the blades may cut narrow slots in the smaller disks toward the center thereof to aid in torque transfer. Of course, the blades and disks would also require weld joints or other bonding to be permanently secured. Horizontal reinforcing supports are shown above and below ring 236 at 240. Also, vertical reinforcing supports extend upward and downward from the horizontal reinforcing supports. In like manner, horizontal center disk reinforcing supports 246 are included above and below the slot through which the disk extends. Finally, vertical reinforcing supports 248 are attached to the horizontal supports.

In operation, wind streams approaching the tower from any direction are compacted and channeled into the rotor by the various wind channels discussed above. When the wind is pushed into the scoops, the rotor moves counterclockwise. The wind hangs in the scoops for an instant by virtue of the ripples formed therein. The wind then spills out of the scoops and flows to the open center of the rotor as depicted by the arrows in FIG. 11. This wind then contacts scoops on the opposite side of the rotor imparting still further energy to the rotor. Also, wind forced into the upper and the lower scoop arrays will transfer energy to the scoops in those arrays and will spill out through the slots such as slot 206, into the scoops postioned vertically adjacent to the slots. Ten scoops are provided in each array, but only five slots are shown for each array out of a possible ten so that only about 40% of the wind will push through the slots.

Wind which does not directly contact the rotor passes around the outside of the tower or over its top. Due to the curved configuration of the tower and upper wind deflector, the wind creates an effective low pressure area on the leeward side of the tower helping to draw the spent air from the rotor.

In order to reduce the noise generated by the rotor as it turns at high speed, it is contemplated that each column of scoops should be manufactured so that vertically adjacent scoops are slightly offset with respect to each other as shown in FIG. 15. By offsetting the scoops in this manner, each column of scoops becomes tilted with respect to a vertical line shown at 252. Accordingly, the scoops slice through the air along side of the struts rather than chop at it thus creating smoother rotor action and reduced noise. In a similar manner, each of the blades can be tilted with respect to the axis of rotation of the rotor thus causing them to slice through oncoming air streams along side of the struts rather than chip at them. Further, slanting the blades and scoops causes the wind to produce a slight lift on the rotor thereby reducing friction and improving the spinning action.

Although the dimensions of the invention will vary according to contemplated use and location thereof, it is contemplated that the rotor should be approximately 20 feet in diameter with a total height of 24 feet, 16 feet of which would comprise the main rotor structure between the upper and lower mounting disks 64, 168. A turbin built with these dimensions should be capable of producing approximately 50 kilowatts of power in a 25 mile per hour wind. The use of the vertical deflector struts, offset scoops and wind channels discussed above could improve this figure by 50% or more.

The user may also desire to add such additional elements as a lightning rod, aircraft warning lights, etc. to the tower to protect it from potential hazards.

Another contemplated feature which can be added, if desired, includes diverters in the form of vertical panels 135 shown in FIG. 1. These panels are disposed along the meeting edges of the triangular roof sections and can be mounted by any suitable means. The purpose of the diverters is to add a vertical component to the air streams directed toward them by wind channels 36. This insures that all of the channeled air is directed up into the rotor.

Various uses of the invention are easily envisioned. The wind turbin could be used on oil drilling platforms at sea where there exist no natural obstructions to air flow. The turbins could be used also to power light house platforms at sea or river inlets thereby taking advantage of the almost constant sea breezes.

With minor alterations, the normal slope of barn roofs can be used as the lower air deflector. Appropriate struts and rotor structure can be added to provide power for pumping, grinding corn, and general electrical production for farm purposes.

The present invention is also amenable for use with computer control. For instance, wind speed and direction sensors could be mounted and the theoretical power output compared to the actual power output could be monitored to indicate the operating efficiency and therefore condition of the entire system. Also, the ambient temperature could be monitored to control heating units automatically thus eliminating the possibility of ice and snow building up during cold weather.

A computer controller could shut the system down automatically during high wind speed conditions so as to ensure that the rotor does not spin too rapidly and become. Obviously, other numerous modifications and variations of the present invention are possible in light of the above teachings. It is therefore to be understood that within the scope of the appended claims, the invention may be practiced otherwise than as specifically described herein.

I claim as my invention:

1. A wind-power generating apparatus, comprising:
   (a) a frame;
   (b) a rotor mounted within said frame for rotation about a vertical axis of rotation, said rotor comprising a plurality of circumferentially spaced wind-gathering elements, including:
      (i) a plurality of radially extending scoops arranged in columns; and
      (ii) a plurality of radially extending curved blades; said blades and columns of scoops being alternately disposed about said rotor, and said rotor having an open axial center for allowing free air flow diametrically through said rotor; and
   (c) air-flow channeling means for directing air flow toward said rotor.

2. The invention as defined in claim 1, wherein said air-flow channeling means includes an upper air-deflector means mounted on said frame above said rotor for forcing air downward toward said rotor.

3. The invention as defined in claim 2, wherein said upper air-deflector means includes a plurality of raised wind channels formed on the surface thereof.

4. The invention as defined in claim 3 wherein said raised wind channels are disposed in downwardly converging spirals to impart a downward swirling motion to impinging air currents.

5. The invention as defined in claim 2, wherein said upper air-deflector means has a substantially horizontal upper surface.

6. The invention as defined in claim 2, wherein said upper air-deflector means has a substantially conical lower surface.

7. The invention as defined in claim 2, wherein said upper air-deflector means comprises the outer surface of an air- or water-storage tank.

8. The invention as defined in claim 1, wherein said air-channeling means further includes a lower air-deflector means mounted on said frame below said rotor for forcing air upward toward said rotor.

9. The invention as defined in claim 8, wherein said lower air-deflector means includes a plurality of raised wind channels formed on the surface thereof.

10. The invention as defined in claim 8, wherein said lower air-deflector means comprises the outer surface of a control room.

11. The invention as defined in claim 1, wherein, in each column of scoops, vertically adjacent scoops are slightly offset with respect to each other in a manner presenting an inclined column outer edge for slicing through an air stream.

12. The invention as defined in claim 1, wherein said rotor further includes an upper mounting disk and a lower mounting disk, said blades extending between and being attached to each of said mounting disks.

13. The invention as defined in claim 12, wherein said rotor further includes upper and lower mounting shafts supported from said frame, and in which said upper mounting disk is attached to said upper mounting shaft and said lower mounting disk is attached to said lower mounting shaft.

14. The invention as defined in claim 12, wherein said rotor further includes an upper scoop array mounted above said upper mounting disk and comprising a plurality of radially extending scoops spaced circumferentially of said rotor and configured to fill the gap between said upper mounting disk and said upper air-deflector means.

15. The invention as defined in claim 14, wherein said rotor further includes a lower scoop array mounted below said lower mounting disk and comprising a plurality of radially extending scoops spaced circumferentially of said rotor and configured to fill the gap between said lower mounting disk and said lower air-deflector means.

16. The invention as defined in claim 15, wherein slots are formed in said upper mounting disk and said lower mounting disk to provide communication between said scoop arrays and said scoop columns.

17. The invention as defined in claim 1 wherein each of said scoops is formed of Kevlar ®.

18. The invention as defined in claim 1, wherein each of said scoops includes a rippled inner surface for delaying the exit of an impinging air stream from said scoop.

19. The invention as defined in claim 1, wherein said frame includes a plurality of vertical structural members spaced about said rotor and further wherein each of said structural members includes a first side extending radially outwardly of said rotor and a second side slanted toward the direction of rotor rotation, said second side meeting said first side to form an outward-facing edge.

20. The invention as defined in claim 1, wherein said frame includes a plurality of vertical strut members positioned at the apices of a pentagon which compares favorably with winds of the Northern hemisphere.

21. A wind-power generating apparatus, comprising:
   (a) a frame;
   (b) a rotor mounted within said frame for rotation about a vertical axis of rotation; and
   (c) air-flow channeling means for directing air flow toward said rotor;
wherein said air-flow channeling means includes an upper air-deflector means mounted on said frame above said rotor for forcing air downward toward said rotor; and wherein said rotor comprises a plurality of circumferentially spaced wind-gathering elements and an open axial center for allowing free air flow diametrically through said rotor, said rotor further comprising:
   (i) a plurality of radially extending scoops arranged in columns;
   (ii) a plurality of radially extending curved blades;
   (iii) an upper mounting disk and a lower mounting disk, said blades extending between and being attached to each of said mounting disks; and
   (iv) an upper scoop array mounted above said upper mounting disk and comprising a plurality of radially extended scoops spaced circumferentially of said rotor and configured to fill the gap between said upper mounting disk and said upper air-deflector means.

22. The invention as defined in claim 21, wherein said upper air-deflector means includes a plurality of raised wind channels formed on the surface thereof.

23. The invention as defined in claim 22, wherein said raised wind channels are disposed in downwardly converging spirals to impart a downward swirling motion to impinging air currents.

24. The invention as defined in claim 23, wherein said upper air-deflector means includes a substantially horizontal upper surface.

25. The invention as defined in claim 23, wherein said upper air-deflector means includes a substantially conical lower surface.

26. The invention as defined in claim 23, wherein said upper air-deflector means comprises the outer surface of an air- or water-storage tank.

27. The invention as defined in claim 21, wherein said air-channeling means further includes a lower air-deflector means mounted on said frame below said rotor for forcing air upward toward said rotor.

28. The invention as defined in claim 27, wherein said lower air-deflector means includes a plurality of raised wind channels formed on the surface thereof.

29. The invention as defined in claim 27, wherein said lower air-deflector means comprises the outer surface of a control room.

30. The invention as defined in claim 21, wherein said rotor further includes a lower scoop array mounted below said lower mounting disk and comprising a plurality of radially extending scoops spaced circumferentially of said rotor and configured to fill the gap between said lower mounting disk and said lower air-deflector means.

31. The invention as defined in claim 30, wherein slots are formed in said upper mounting disk and said lower mounting disk to provide communication between said scoop arrays and said scoop columns.

32. The invention as defined in claim 21, wherein said rotor further includes upper and lower mounting shafts supported from said frame, and in which said upper mounting disk is attached to said upper mounting shaft, and said lower mounting disk is attached to said lower mounting shaft.

33. The invention as defined in claim 21, wherein in each column of scoops, vertically adjacent scoops are slightly offset with respect to each other in a manner presenting an inclined column outer edge for slicing through an air stream.

34. The invention as defined in claim 21, wherein each of said scoops is formed of Kevlar ®.

35. The invention as defined in claim 21, wherein each of said scoops includes a rippled inner surface for delaying the exit of an impinging air stream from said scoop.

36. The invention as defined in claim 21, wherein said frame includes a plurality of vertical structural members spaced about said rotor and further wherein each of said structural members includes a first side extending radially outwardly of said rotor and a second side slanted towrd the direction of rotor rotation, said second side meeting said first side to form an outward-facing edge.

37. The invention as defined in claim 21, wherein said frame includes a plurality of vertical strut members positioned at the apices of a pentagon which compares favorably with winds of the Northern hemisphere.

* * * * *

UNITED STATES PATENT AND TRADEMARK OFFICE
CERTIFICATE OF CORRECTION

PATENT NO. : 4,365,929
DATED : December 28, 1982
INVENTOR(S) : Philip Retz

It is certified that error appears in the above—identified patent and that said Letters Patent is hereby corrected as shown below:

Column 5, line 19, "clockwise" should read --counter-clockwise--;

line 20, "FIG. 1" should read --FIG. 6--.

Column 9, line 6, "64" should read --164--;

line 17, "135" should read --134--;

line 47, after "become", insert --damaged--.

Signed and Sealed this

Twelfth Day of July 1983

[SEAL]

Attest:

GERALD J. MOSSINGHOFF

Attesting Officer      Commissioner of Patents and Trademarks